United States Patent
Ishikawa et al.

[11] Patent Number: 6,036,618
[45] Date of Patent: Mar. 14, 2000

[54] CONTINUOUSLY VARIABLE TRANSMISSION OF HALF-TOROIDAL TYPE

[75] Inventors: Kouji Ishikawa; Hiromichi Takemura; Hiroyuki Itoh; Hiroshi Kato; Takashi Imanishi, all of Fujisawa, Japan

[73] Assignee: NSK Ltd., Tokyo, Japan

[21] Appl. No.: 09/190,950

[22] Filed: Nov. 12, 1998

[30] Foreign Application Priority Data

Nov. 17, 1997 [JP] Japan .................................. 9-315276

[51] Int. Cl.[7] .................................................. F16H 15/38
[52] U.S. Cl. ........................................................ 476/40
[58] Field of Search ........................................ 476/40, 42

[56] References Cited

U.S. PATENT DOCUMENTS

| 5,218,877 | 6/1993 | Fukushima et al. . |
| 5,372,355 | 12/1994 | Hibi . |
| 5,556,348 | 9/1996 | Kokubu et al. ........................... 476/40 |
| 5,575,736 | 11/1996 | Takemura . |
| 5,735,769 | 4/1998 | Takemura et al. ........................ 476/40 |
| 5,823,911 | 10/1998 | Hibi ......................................... 476/40 |
| 5,855,531 | 1/1999 | Mitamura et al. ........................ 476/46 |

FOREIGN PATENT DOCUMENTS

| 9-126289 | 5/1997 | Japan . |
| 9126289A | 5/1997 | Japan . |

*Primary Examiner*—Allan D. Herrmann
*Attorney, Agent, or Firm*—Christensen O'Connor Johnson & Kindness PLLC

[57] ABSTRACT

A continuously variable transmission of the half-toroidal type, comprising an input shaft connected to a drive source, an input disc supported on the input shaft, an output disc supported on the input shaft and opposed to the input disc, and a power roller provided between the input and output discs for rocking motion and in rolling contact with the discs. In this transmission, the discs are shaped so that $(R \cdot d)/(D \cdot t)$ is given by $0.5 < (R \cdot d)/(D \cdot t) < 1.5$, where R is the radius of curvature of each traction surface, D is the distance between the centers of curvature, d is the inside diameter of each disc, and t is the thickness of each disc.

1 Claim, 3 Drawing Sheets

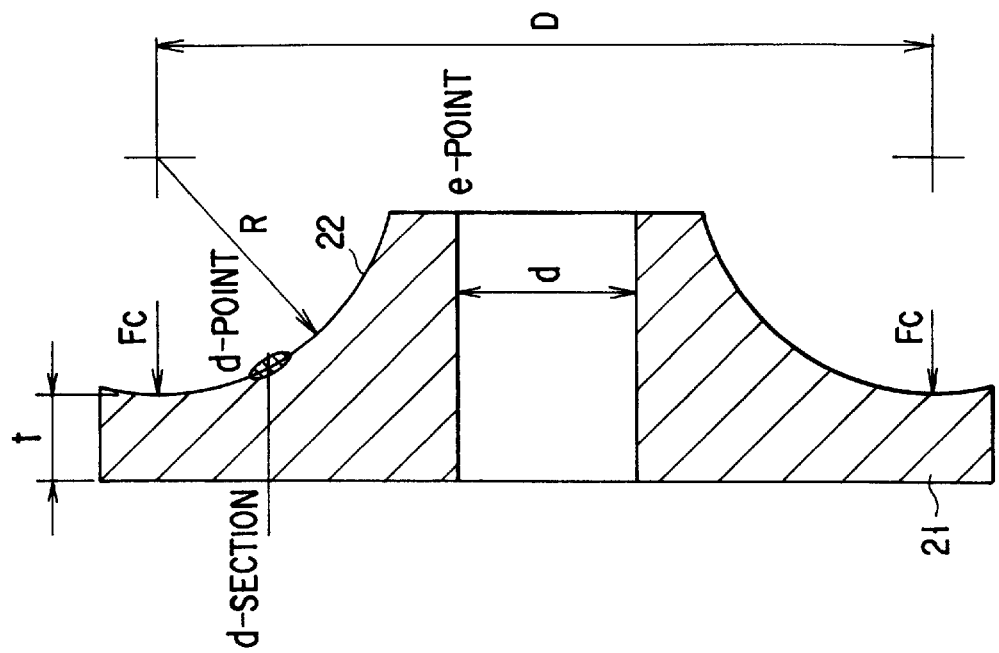
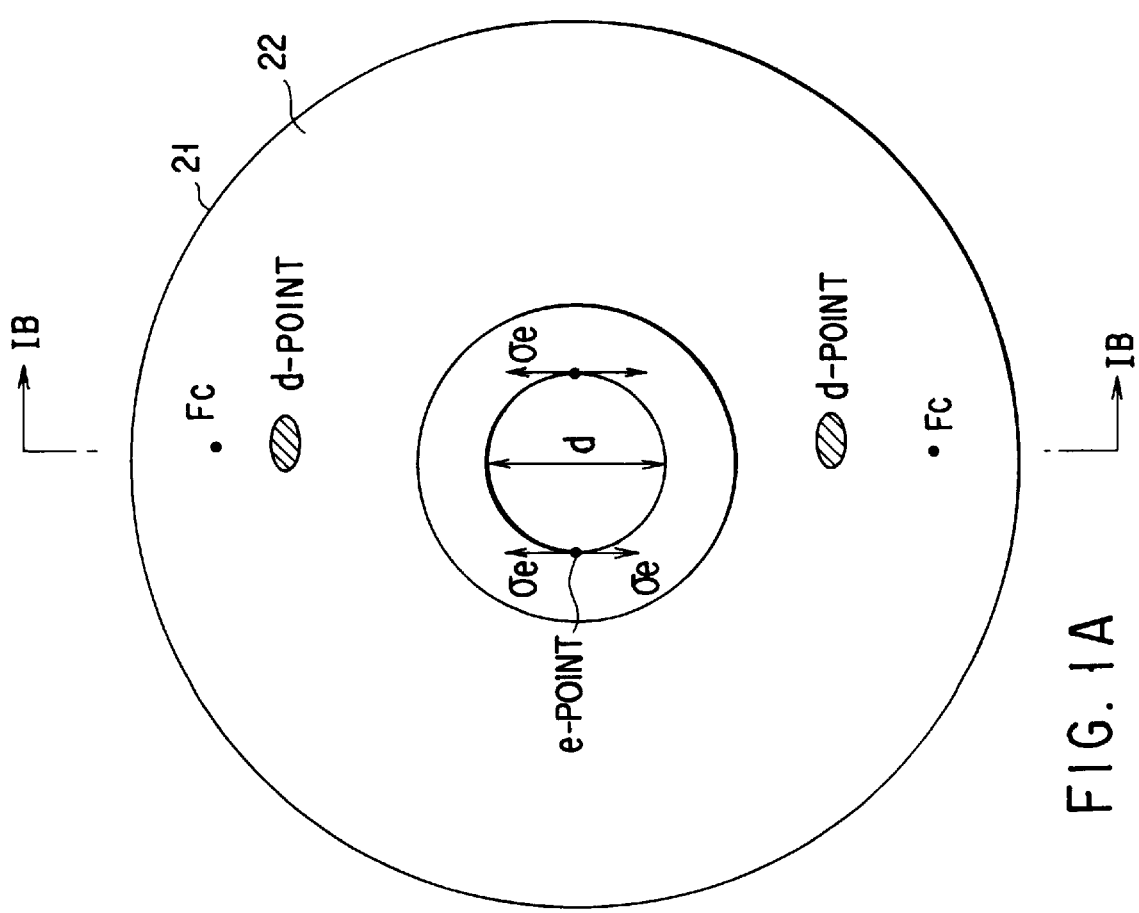
FIG. 1B
FIG. 1A

CONTINUOUSLY VARIABLE TRANSMISSION OF HALF-TOROIDAL TYPE

BACKGROUND OF THE INVENTION

The present invention relates to a continuously variable transmission of the half-toroidal type for use as an automotive transmission, for example, and more particularly, to an improvement of discs.

A continuously variable transmission of the half-toroidal type, such as the one described in U.S. Pat. No. 5,372,555, is provided with an input shaft capable of rotating integrally with a drive source, such as an engine, and an input disc and an output disc supported on the input shaft. A cam flange is provided at the back of the input disc. The cam flange is in spline-engagement with the input shaft. Cam rollers are interposed between the cam flange and the input disc. The input disc is pressed toward the output disc by means of a push mechanism of the loading-cam type.

Trunnions, which are rockable around a pivot each, are arranged between the input and output discs. A displacement shaft is located in the central portion of each trunnion. A power roller is rotatably supported on the displacement shaft. The power roller has a traction portion in rolling contact with the input and output discs. Between the input and output discs, the power roller can rock around the pivot of the trunnion, thereby changing its angle of inclination, depending on the speed change ratio between the discs.

A ball thrust bearing, which serves as a power roller bearing, is provided with between each trunnion and its corresponding power roller. This bearing bears a thrust-direction load on the power roller and allows the roller to rotate. The rotation of the input disc is transmitted to the output disc through the power roller. High pressure is generated in each of the discs and the power roller. This pressure can be explained according to the Hertz theory of contact stress. The Hertz theory of contact stress is applicable to the analysis of contact between two fine objects that are surrounded individually by different closed curved surfaces. This theory cannot be complied unless the thickness of each disc is greater enough than the length of the contact surface (elliptic surface). Accordingly, each conventional disc is made thick enough to resist high pressure.

As a demand for the reduction in size and weight of modern continuously variable transmissions of the half-toroidal type increases, however, the section thickness of the discs is expected to be reduced. If the discs are thinned, it may be difficult to use them in compliance with the Hertz theory of contact stress, in some cases. Besides, bending stress acts on the discs. Inevitably, in this state, stress regions near points of contact between the power roller and the discs are disturbed by the bending stress. This results in the production of a greater stress, which may damage the discs. Further, tensile stress that acts on the discs may possibly break the discs.

BRIEF SUMMARY OF THE INVENTION

Accordingly, the object of the present invention is to provide a continuously variable transmission of the half-toroidal type, capable of lightening contact pressure or tensile stress acting on input and output discs, thereby preventing the discs from being damaged and improving their durability.

In order to achieve the above object, according to the present invention, there is provided a continuously variable transmission of the half-toroidal type provided between a drive source and a driven body, comprising an input shaft rotatable by means of the drive source, an input disc supported on the input shaft, an output disc supported on the input shaft and opposed to the input disc, and a power roller provided between the input and output discs for rocking motion and in rolling contact with both of the discs, wherein each of the input and output discs has a traction surface in contact with the power roller, characterized in that the discs are shaped so that $(R \cdot d)/(D \cdot t)$ is given by $0.5 < (R \cdot d)/(D \cdot t) < 1.5$, where R is the radius of curvature of each traction surface, D is the distance between the respective centers of curvature of the traction surfaces of the discs, d is the inside diameter of each disc, and t is the thickness of each disc.

In the continuously variable transmission of the half-toroidal type, the contact pressure is given by $$Pmax \propto K^n \sqrt[3]{\{(R-m)/Rm\}^2}, \quad (1)$$

where $1/m = 1/rP1 + 1/rP2$ is given, and K, n and m are constants.

Expression (1) can be rearranged as follows:

$$Pmax \propto K^n R^{2/3} \quad (2)$$

If the distance D between the respective centers of curvature of the traction surfaces of the input and output discs is increased, the contact force at the point of contact can be reduced to lower the contact pressure, so that we obtain $$Pmax \propto 1/D^2. \quad (3)$$

From expressions (2) and (3), the contact pressure can be supposed to be $$Pmax \propto R/D. \quad (4)$$

In order to reduce the weight and size of each disc, the disc may be designed so that its section thickness is reduced or its inside diameter is increased. If this is done, however, the section thickness t of the disc 21 is substantially reduced at points A and B near the outer and inner peripheries, respectively, of the traction surface 22 of disc.

If the section thickness t of the disc 21 is reduced, there is a possibility of the disc being used without conforming to the Hertz theory of contact stress. More specifically, if the disc 21 is thin, the Hertz stress distribution is disturbed by bending stress that is attributable to deformation of the disc 21, and predictably, the stress further increases. In other words, Pmax at the point A near the outer periphery of the disc 21 can be stabilized by increasing the thickness t of the disc. At the point B near the inner periphery of the disc 21, moreover, Pmax can be stabilized by reducing the inside diameter d of the disc 21 to increase the section thickness t of the disc.

Thus, we obtain $$Pmax \propto 1/t, \quad (5)$$

$$Pmax \propto d. \quad (6)$$

In consideration of expressions (4), (5) and (6), the contact pressure can be supposed to be given by $$Pmax \propto (R \cdot d)/(D \cdot t). \quad (7)$$

Then, in the case where a load Fc acts for tensile stress generated in the disc 21, a d-point is subjected to $$\sigma d = (M/Z) d\text{-section} \ X(R/Dt^2)Fc, \quad (8)$$

where X is a constant.

In order to lessen tensile stress that is generated at an e-point, moreover, it is necessary only that the inside diameter d be reduced.

Thus, we obtain $$\sigma_e \ Y \cdot dFc, \quad (9)$$

where Y is a constant.

From expressions (8) and (9), σ can be supposed to be $$\sigma \ (R \cdot d)/(D \cdot t). \quad (10)$$

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a front view of a disc of a continuously variable transmission of the half-toroidal type according to an embodiment of the present invention;

FIG. 1B a sectional view of the disc taken along line 1B—1B of FIG. 1A;

DETAILED DESCRIPTION OF THE INVENTION

An embodiment of the present invention will now be described with reference to the accompanying drawings.

Figure 4:
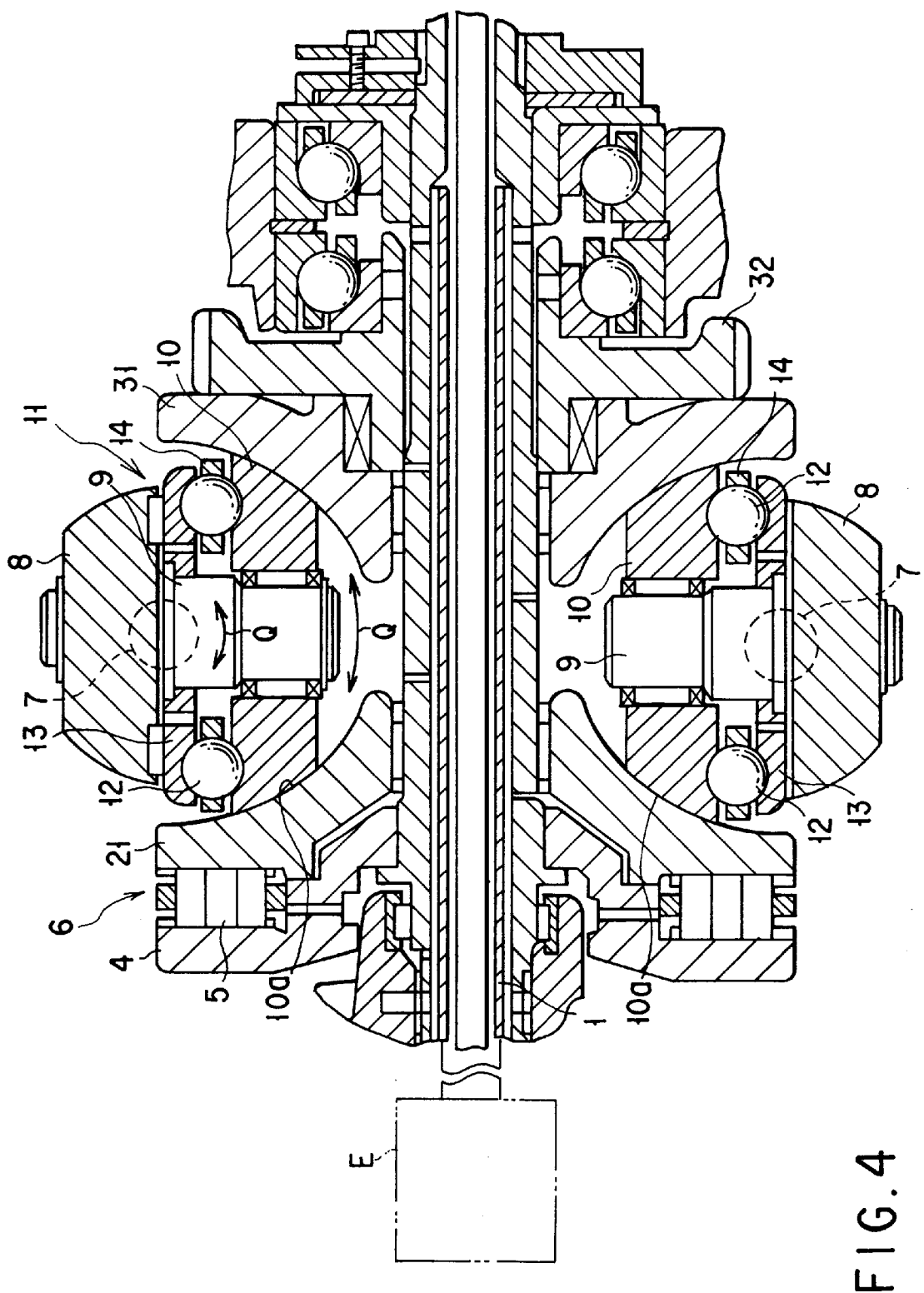
FIG. 4 is a longitudinal sectional side view showing part of the continuously variable transmission of the half-toroidal type.

A continuously variable transmission of the half-toroidal type shown in FIG. 4 comprises an input shaft 1, which rotates integrally with a drive source E including an engine and the like. The input shaft 1 is provided with an input disc 21 and an output disc 31 that are spaced in the axial direction of the shaft 1. A cam plate 4 is located behind the input disc 21. The cam plate 4 and the input disc 21 are individually in spline-engagement with the input shaft 1 and rotate integrally with the shaft 1. Cam rollers 5 are interposed between the cam plate 4 and the input disc 21. The input disc 21 is pressed toward the output disc 31 by means of a push mechanism 6 of the loading-cam type including the cam rollers 5. The output disc 31 is rotatably supported on the input shaft 1. A driven body 32, such as a gear, can rotate integrally with the output disc 31.

Trunnions 8 are arranged between the input and output discs 21 and 31. Each trunnion 8 can rock in the direction indicated by arrow Q in FIG. 4 around a pivot 7. A displacement shaft 9 is located in the central portion of each trunnion 8. A power roller 10 is rotatably supported on the shaft 9. The power roller 10 has a traction portion 10a in rolling contact with the input and output discs 21 and 31. Between the input and output discs 21 and 31, the roller 10 can change its inclination in the direction of arrow Q around the pivot 7, depending on the speed change ratio between the discs 21 and 31.

A ball thrust bearing 11, which serves as a power roller bearing, is provided with between each trunnion 8 and its corresponding power roller 10. The bearing 11 bears a thrust-direction load on the power roller 10 and allows the roller 10 to rotate. A plurality of balls 12 that constitute the ball thrust bearing 11 are held by means of a ring-shaped retainer 14. The retainer 14 is interposed between a ring-shaped outer race 13 attached to the trunnion 8 and the power roller 10 as a rotating part.

The rotation of the input disc 21 is transmitted to the output disc 31 as the power roller 10 rotates. High pressure is generated in each of the discs 21 and 31 and the power roller 10. This pressure can be explained according to the Hertz theory of contact stress.

FIGS. 1A and 1B representatively show the input disc 21, out of the two discs 21 and 31 of the continuously variable transmission of the half-toroidal type. The discs 21 and 31 have their respective traction surfaces 22 substantially in the same shape. If the distance between the respective centers of curvature of the traction surfaces 22 of the disc 21, the radius of curvature of each surface 22, the inside diameter of the disc 21, and the thickness of the disc 21 are D, R, d and t, respectively, the disc 21 has a shape given by 0.5<(R·d)/(D·t)<1.5.

Figure 2:
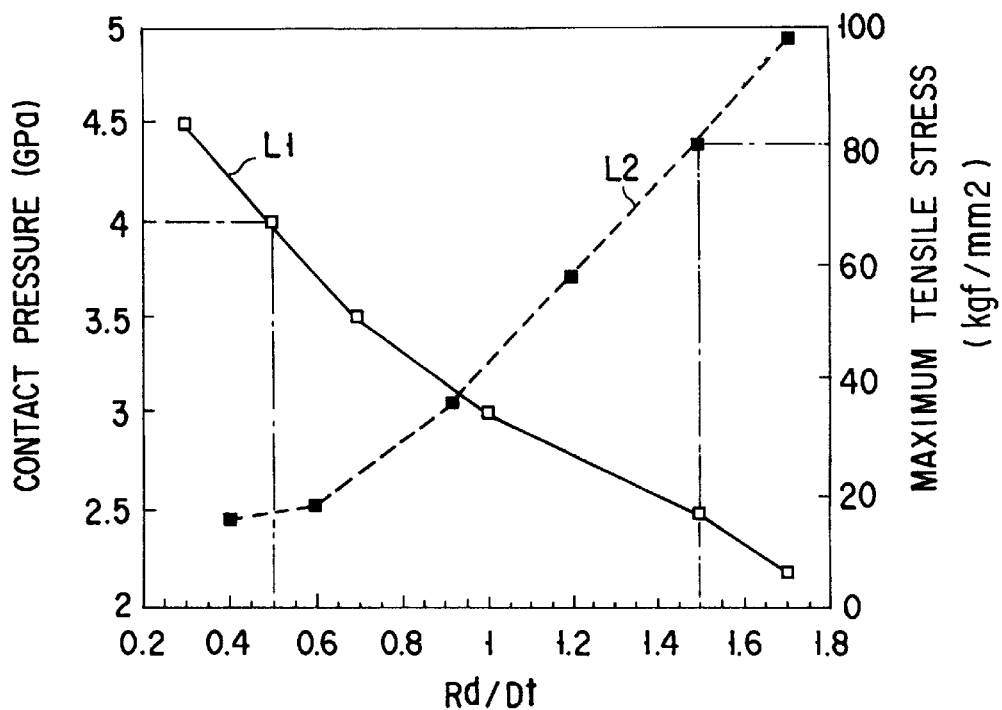
FIG. 2 is a diagram showing relations between (R·d)/(D·t), contact pressure (GPa), and maximum tensile stress (kgf/mm²)
Figure 3:
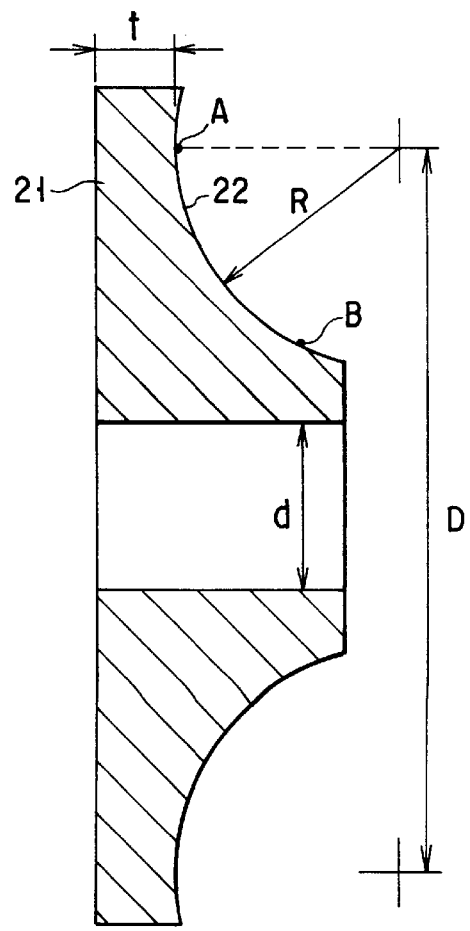
FIG. 3 is a sectional view showing points A and B near the outer and inner peripheries, respectively, of the disc.

In FIG. 2, the axis of abscissa, left-hand axis of ordinate, and right-hand axis of ordinate represent (R·d)/(D·t), contact pressure (GPa), and maximum tensile stress (kgf/mm²), respectively. In FIG. 2, moreover, full line L1 and broken line L2 represent observed values of the contact pressure (GPa) and maximum tensile stress (kgf/mm²), respectively.

If (R·d)/(D·t) is lower than 0.5, as shown in FIG. 2, the contact pressure of each traction surface is inevitably higher than 4.0 GPa. The value 4.0 GPa is the impression limit for the disc 21 and the power roller.

TABLE 1 below shows results of durability tests on ten discs (No. 1 to No. 10) of different sizes subjected to a maximum load.

TABLE 1

| Test No. | D | R | d | t | Rd/Dt | Stress (kgf/mm²) | Test Result | Decision |
|---|---|---|---|---|---|---|---|---|
| No. 1 | 130 | 40 | 39 | 18 | 0.7 | 22 | Target 200 hrs. cleared. | ○ |
| No. 2 | 130 | 40 | 39 | 13 | 0.9 | 35 | Target 200 hrs. cleared. | ○ |
| No. 3 | 130 | 40 | 39 | 8 | 1.5 | 78 | Target 200 hrs. cleared. | ○ |
| No. 4 | 130 | 40 | 39 | 7 | 1.7 | 98 | Broken in 46 hrs. | X |
| No. 5 | 144 | 45 | 45 | 15 | 0.9 | 35 | Target 200 hrs. cleared. | ○ |
| No. 6 | 144 | 45 | 45 | 13 | 1.1 | 52 | Target 200 hrs. cleared. | ○ |
| No. 7 | 144 | 45 | 45 | 10 | 1.4 | 75 | Target 200 hrs. cleared. | ○ |
| No. 8 | 144 | 45 | 45 | 9 | 1.6 | 88 | Broken in 147 hrs. | X |
| No. 9 | 120 | 38 | 36 | 9 | 1.3 | 67 | Target 200 hrs. cleared. | ○ |
| No. 10 | 120 | 38 | 36 | 7 | 1.6 | 82 | Broken in 176 hrs. | X |

When (R·d)/(D·t) was higher than 1.5, the maximum tensile stress exceeded 80 kgf/mm², and the disc 21 was broken within 200 hours, as seen from the results of the durability tests shown in TABLE 1. Thus, the tensile stress of 1.5 was concluded to be the upper limit of the maximum load.

For these reasons, it may be concluded that the target period of 200 hours can be cleared if $0.5 \leq (R·d)/(D·t) \leq 1.5$ is established. In the aforesaid durability tests, 200 hours is a period of time that is equivalent to the practically necessary durability for an automobile. In TABLE 1, "○" and "X" in columns for "decision" indicate acceptable durability and unacceptable durability, respectively.

Preferably, the discs 21 and 31 are shaped so that $0.7 \leq (R·d)/(D·t) \leq 1.3$ is fulfilled. If (R·d)/(D·t) is within this range, the contact pressure is at a value about 15% lower than its upper limit value 4.0 GPa, as shown in FIG. 2, and the maximum tensile stress is at a value 15% lower than its upper limit value 80 kgf/mm². Thus, the contact pressure and the maximum tensile stress are low enough. Besides, the test results of TABLE 1 indicate that the target period is cleared.

Further preferably, the discs 21 and 31 should be shaped so that $0.9 \leq (R·d)/(D·t) \leq 1.1$ is fulfilled. If (R·d)/(D·t) is within this range, the respective values of the contact pressure and the maximum tensile stress are balanced within regions that are low enough, so that each disc can be expected to enjoy further improved durability and the like. Besides, the test results of TABLE 1 indicate that the target period is cleared.

If the distance D between the respective centers of curvature of the traction surfaces 22 of the disc 21 and the radius R of curvature of each surface 22 increase, the rated torque also increases, and the force of pressure on the contact surface is enhanced. Since the value given by (R·d)/(D·t) is a nondimensional quantity, however, the stress is substantially uniform even though D or R varies. Therefore, the same results can be obtained despite the change of the size of the disc 21 that depends on the torque capacity of the disc 21.

Although the input disc 21 has been described representatively, the same applies to the output disc 31. According to the foregoing embodiment, moreover, the continuously variable half-toroidal transmission of the single-cavity type has been described. However, the present invention is also applicable to a continuously variable half-toroidal transmission of the double-cavity type with the same result.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A continuously variable transmission of the half-toroidal type, comprising:

an input shaft rotatable by means of a drive source;

an input disc supported on the input shaft;

an output disc supported on the input shaft and opposed to the input disc; and a power roller provided between the input and output discs for rocking motion and in rolling contact with both of the discs, wherein each of the input and output discs has a traction surface in contact with the power roller, and the discs are shaped so that (R·d)/(D·t) is given by $0.5 < (R·d)/(D·t) < 1.5$, where R is the radius of curvature of each traction surface, D is the distance between the respective centers of curvature of the traction surfaces of the discs, d is the inside diameter of each disc, and t is the thickness of each disc.

* * * * *